Patented Sept. 10, 1935

2,014,007

UNITED STATES PATENT OFFICE 2,014,007

FABRIC CLEANING AND DYEING COMPOSITION

Eugene C. Pailler, Boston, Mass., assignor to Silk-Eze Corporation, Boston, Mass., a corporation of Delaware No Drawing. Application December 11, 1930, Serial No. 501,673

10 Claims. (Cl. 8—6)

An object of this invention is the provision of a composition highly effective in cleaning fabrics, especially silks and woolens, and at the same time imparting a color thereto. A further object is to provide a composition whereby fabrics may be expeditiously and effectively cleaned and dyed concurrently and without injury to the fabrics. I have produced a composition which fulfills these requirements and which moreover is readily soluble in water and thus may be conveniently utilized.

My cleaning and dyeing composition preferably comprises a soap, preferably a vegetable oil soap; a soluble sulphonated fat or oil, such as sulphonated tallow, sulphonated olive oil, sulphonated castor oil, Turkey red oil, or olive Turkey red oil; a soluble albuminoid, such as sericin, gelatin, keratin, or casein; a soluble alkali chloride (such as ammonium chloride, sodium chloride, or potassium chloride); a soluble alkali sulphate (such as ammonium sulphate, sodium sulphate or potassium sulphate); and a dye (such as magenta 443, auromine 425, and indamine 588). Also, I prefer to include a soluble alkali, preferably perborate of soda, for maintaining the solution alkaline, and preventing precipitation of soap. An emulsifying agent soluble in water, such as gum acacia or other water soluble gum may, if desired, also be added.

The proportions of the ingredients in my composition may be varied, but good results have been obtained with aproximately the following proportions:

| | Pounds |
|---|---|
| Vegetable oil soap | 100 |
| Soluble sulphonated oil or fat | 2½ |
| Soluble albuminoid | 7½ |
| Soluble alkali chloride | 2½ |
| Soluble alkali sulphate | 5 |
| Perborate of soda | 3 |

To the above there is added a dye, preferably a coal tar dye. For example, quantities ranging up to about a pound of a dye such as magenta, auramine or indamine may be added. The amount will of course depend upon the strength of the dye and the shade of color desired.

The above ingredients, in powdered form, are mixed together and stirred to insure thorough mixing. About two ounces of gum acacia may also be included with the ingredients in the proportions above indicated. The proportionate amounts of the ingredients may be relatively increased or diminished from those above specified depending upon the strength or results desired.

The various ingredients may, if desired, be added to and mixed with the soap while it is in liquid or semi-liquid form during its process of manufacture; or they may be added and mixed with the soap after it has been dried. In either event the composition, in its final form, is preferably powdered.

My composition above described cleanses fabrics (especially silks and woolens) not only without injury thereto but also with a beneficial effect thereon. The latter is apparently due to a chemical inter-action arising from the presence of the sulphonated oil and albuminoid, as the result of which an efficient protective coating is deposited upon the fabric. This protective coating is, moreover, hygroscopic so that if the fabric should become wet, as by rain or otherwise, the water is spread through a large area, thus preventing the showing of marks or spots. At the same time the dye is caused to be effectively fixed to the fabric, the alkali sulphate, alkali chloride, and albuminoids apparently assisting in this connection. Fabrics treated with my composition are not only thoroughly cleaned but also effectively retain the color imparted thereto, despite numerous repeated washings.

The composition may be readily utilized for cleaning and dyeing purposes by dissolving it in water. Effective results may be obtained by dissolving a tablespoonful of the composition in a basin of lukewarm water. The solution is then agitated to form suds and the fabric is immersed therein, and is worked through the solution by squeezing. When the desired tint has been imparted to the fabric the latter is rinsed in water, lukewarm or cold, and the water is then squeezed out, preferably without wringing.

As has been pointed out, my composition is highly effective as a cleaner and spot remover for fabrics, especially silks and woolens, and accomplishes its functions without injuring the fabrics. It also prevents silks, whether natural or artificial, from being spotted by water. It is furthermore efficacious in removing water spots from silks and in rendering them spot proof, and also effectively cleans woolen fabrics without causing shrinkage thereof. Concurrently with its cleaning and spot-proofing action above referred to the composition causes the desired color to be effectively applied to and retained upon the fabrics.

While I prefer that the composition be in powdered form it may obviously be in a form other than powdered or it may be marketed in solution.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

I claim:

1. A fabric cleaning and dyeing composition comprising a vegetable oil soap as its principal ingredient, a soluble sulphonated oil or fat, a soluble albuminoid, a soluble alkali sulphate, ammonium chloride, an alkali perborate, and a coal tar dye, said composition being adapted to tint silken and woolen fabrics when the composition is applied thereto in the presence of lukewarm water.

2. A fabric cleaning and dyeing composition comprising soap as its major ingredient, a basic dye, an albuminoid, an alkali perborate, and a sulfonated oil or fat, said composition being capable of tinting silken and woolen fabrics when the composition is applied thereto in the presence of lukewarm water.

3. A marketable composition of matter for cleaning and dyeing silken and woolen fabrics, comprising as its principal ingredient a vegetable oil soap, a dye capable of fastly tinting said fabrics when the composition is applied thereto in the presence of lukewarm water, the resulting solution being approximately neutral and the dye being present in an amount in the order of a small percentage of the amount of soap, a sulphonated oil, an albuminoid adapted to form a colloid, a mildly alkaline perborate and a soluble inorganic sulfate.

4. A marketable composition of matter for cleaning and dyeing silken and woolen fabrics, comprising a soap in amount in the order of four to five times the total weight of the other ingredients, a dye capable of fastly tinting said fabrics when the composition is applied thereto in the presence of lukewarm water, the resulting solution being approximately neutral, sulphonated oil in amount in the order of two and a half times the weight of the dye, an albuminoid adapted to form a colloid and present in an amount in the order of seven and a half times the weight of the dye, a mildly alkaline perborate, ammonium chloride and sodium sulphate, said two last-named salts being present in relatively small proportions as compared to the soap.

5. A fabric cleaning and dyeing composition in dry powdered form and effective when dissolved in lukewarm water, said composition containing a major quantity of a vegetable oil soap, and smaller amounts of a soluble sulfonated oil or fat, a coal tar dye which will tint silk or wool, and a soluble albuminoid, said sulfonated oil and soap functioning to cleanse the fabric, and the albuminoid and sulfonated oil functioning to proof the dyed fabric against water-spotting.

6. A fabric cleaning and dyeing composition in dry powdered form, and effective when dissolved in lukewarm water, said composition containing a major quantity of a vegetable oil soap, and smaller amounts of a soluble sulfonated oil or fat, a coal tar dye which will tint silk or wool, a soluble albuminoid and an alkali metal chloride, said sulfonated oil and soap functioning to cleanse the fabric, the albuminoid and sulfonated oil functioning to proof the dyed fabric against water-spotting, and the chloride functioning to drive the dye stuff into the fabric.

7. A fabric cleaning and dyeing composition in dry powdered form, and effective when dissolved in lukewarm water, said composition containing a major quantity of a vegetable oil soap and smaller amounts of a soluble sulfonated oil or fat, a coal tar dye which will tint silk or wool, a soluble albuminoid, a soluble alkali metal chloride, and a soluble alkali metal sulphate, said sulfonated oil and soap functioning to cleanse the fabric, the albuminoid and sulfonated oil functioning to proof the dyed fabric against water-spotting, and the chloride and sulphate functioning to drive the dye stuff into the fabric.

8. A fabric cleaning and dyeing composition in dry powdered form, and effective when dissolved in lukewarm water, said composition containing a major quantity of a vegetable oil soap and smaller amounts of a soluble sulfonated oil or fat, a coal tar dye which will tint silk or wool, a water soluble albuminoid, an alkali metal chloride, an alkali metal sulphate, and an alkali metal perborate, said sulfonated oil and soap functioning to cleanse the fabric, the albuminoid and sulfonated oil functioning to proof the dyed fabric against water-spotting, the chloride and sulphate functioning to drive the dye stuff into the fabric, and the perborate functioning to render an aqueous solution of said composition mildly alkaline and to assist in the cleansing action.

9. A fabric cleaning and dyeing composition in dry powdered form, and effective when dissolved in lukewarm water, said composition containing a major quantity of a vegetable oil soap and smaller amounts of a soluble sulfonated oil or fat, a coal tar dye which will tint silk or wool, a soluble albuminoid, an alkali metal chloride, an alkali metal sulphate, an alkali metal perborate, and a water-soluble gum, the sulfonated oil and soap functioning to cleanse the fabric, the albuminoid and sulfonted oil functioning to proof the dyed fabric against water-spotting, the chloride and sulphate functioning to drive the dye stuff into the fabric, the perborate functioning to render an aqueous solution of said composition mildly alkaline and to assist in the cleansing action, and the gum functioning to emulsify any particles of dirt and thus prevent precipitation thereof on the fabric.

10. A fabric cleaning and dyeing composition comprising a vegetable oil soap as its major ingredient, a dye capable of tinting silken and woolen fabrics, a soluble alkali metal chloride, a sulfonated oil or fat, an albuminoid, and a perborate salt.

EUGENE C. PAILLER.